United States Patent Office 2,872,083
Patented Feb. 3, 1959

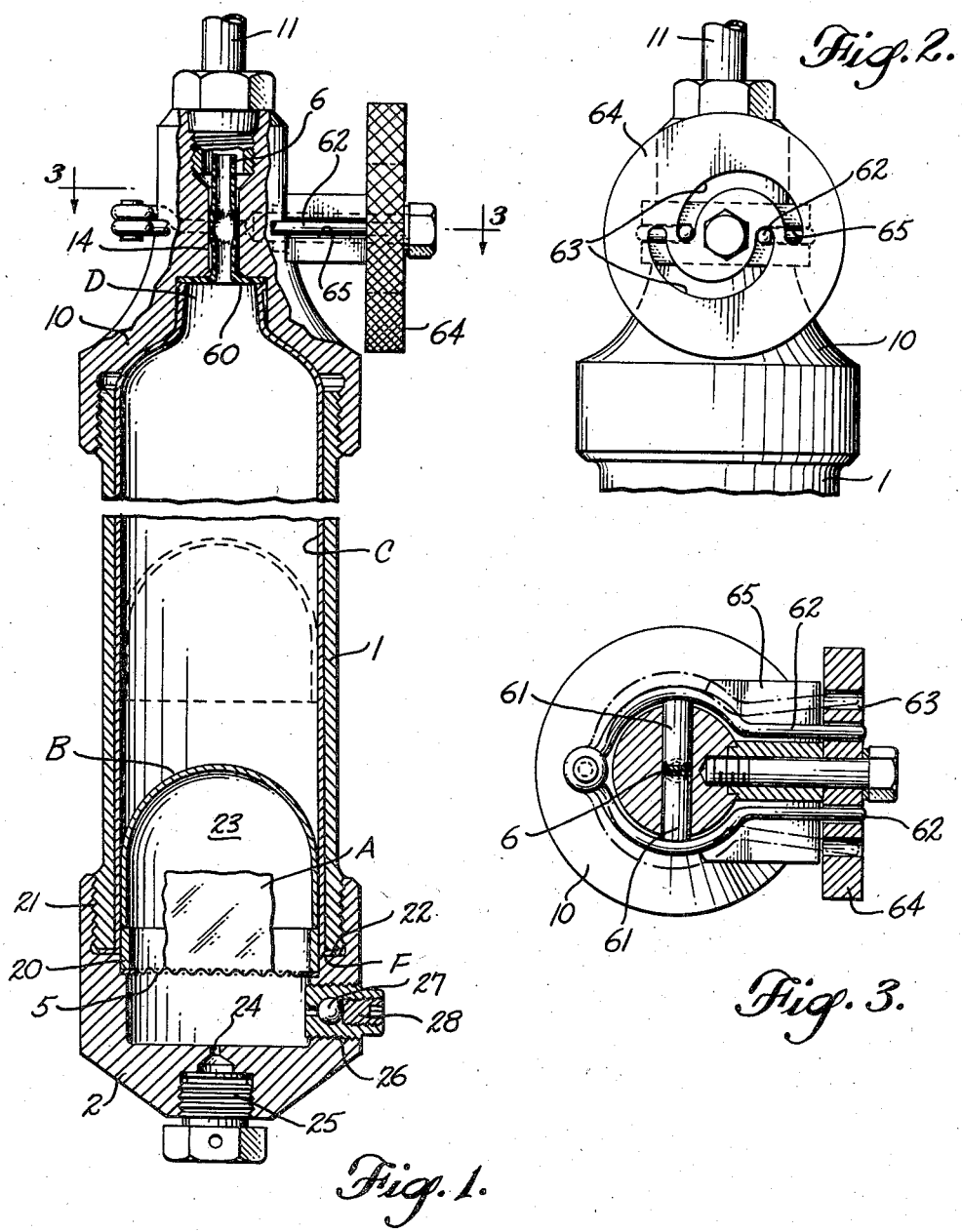

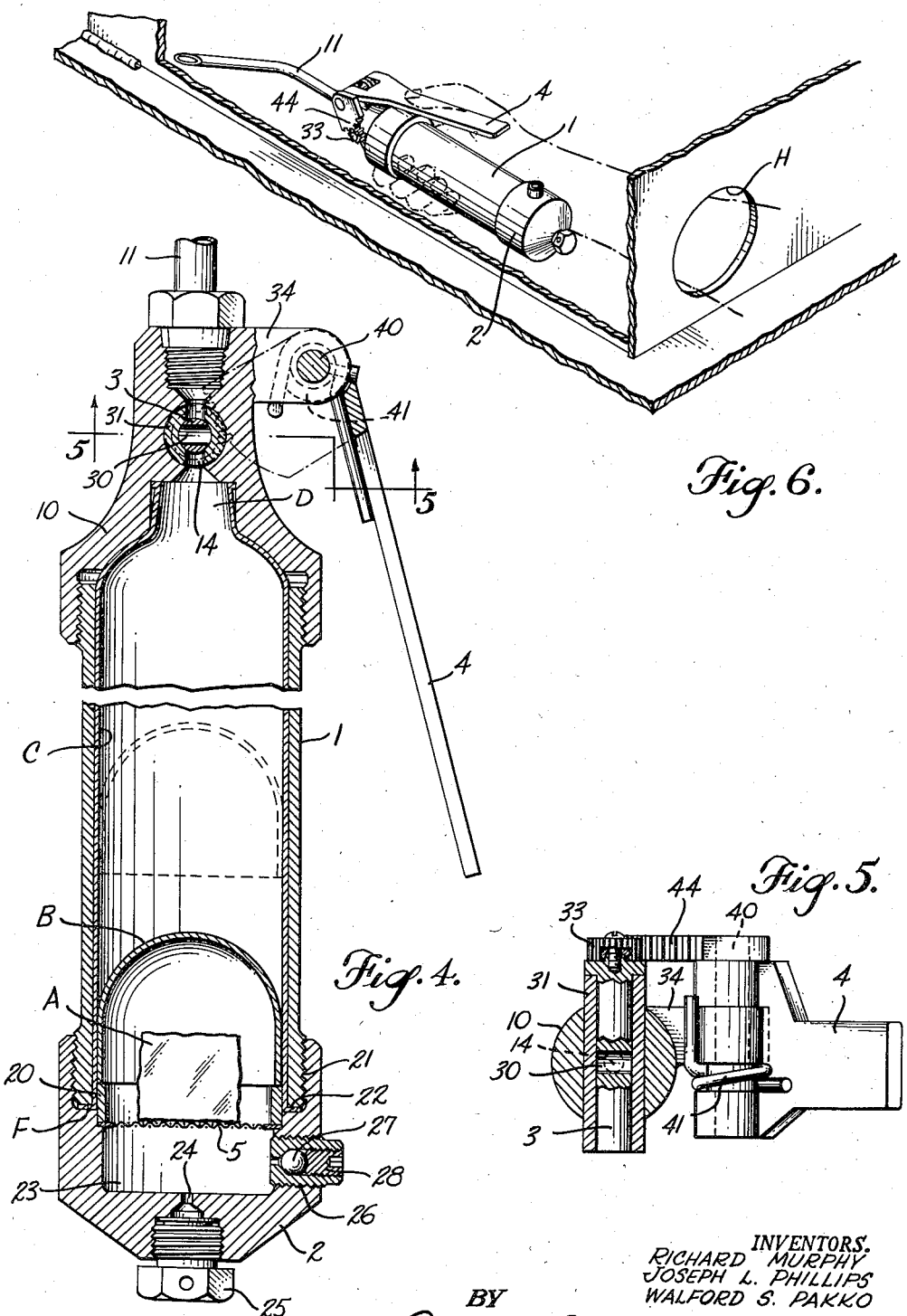

2,872,083
DRY ICE SEALANT GUNS

Richard J. Murphy, Auburn, Wash., Joseph L. Phillips, State College, Pa., and Walford S. Pakko, Seattle, Wash., assignors to Boeing Airplane Company, Seattle, Wash., a corporation of Delaware Application February 16, 1956, Serial No. 565,955

8 Claims. (Cl. 222—327)

In the aircraft industry, in particular, and in other places, a plastic sealant compound is used to seal joints or seams that must be liquid-tight or airtight. The sealant compound sets upon access of air, so that it must be kept in an airtight dispenser. It must, however, be ready for use promptly when needed, even after some days of disuse, and must always be exuded with constant pressure and at a constant rate, to avoid waste.

Such plastic material is normally supplied within a carton, of generally tubular shape, having at one end a discharge opening, and at its other end a slidably fitted bottom. For dispensing, the carton is fitted within a cylindrical barrel, and the bottom of the carton is urged, as a plunger, towards the discharge opening, whenever some of the material is required for application to a joint. This urging has sometimes been accomplished by screwing a piston axially within the barrel, engaging the carton's bottom and pushing the latter ahead of it. This operation requires two hands, one to hold the barrel and the other to screw in the piston, and is difficult to accomplish when the point of application of the sealant is deep within a closed structure, accessible only through a small access opening. It is likely, too, to be wasteful of sealant because of the difficulty of accurate control of the dispensing nozzle while manipulating the screw. Because of such factors, it has sometimes been the practice to urge the piston axially by air pressure applied to its outer face by means of an air hose from an external pressure source. This has not proven altogether satisfactory, because of the long trailing hose often required, particularly when the application is deep within a closed space.

According to the present invention the sealant-applying tool is wholly self-contained, explusion of the sealant being accomplished by pressure generated within a chamber at the base of the cylinder or barrel by the sublimation of a gas, such as carbon dioxide, that can be supplied in solid form. Thereby all trailing hoses or wires, and all necessity for two-hand operation, are eliminated. With one hand the operator can control exudation very accurately and economically, and need pay no attention to his pressure source, which during the useful life of a loading is substantially constant and sufficient.

Safety means, and means to effect equalization of pressure within and without, for reloading, are desirable, and are provided for in the sealant gun of this invention.

It is also an object to provide a gun of the type indicated, which is especially formed to cooperate with a carton of the type which is commonly used, and which will insure the successful operation of such a carton bottom to expel the plastic material, without the likelihood of admixture of any gas with the plastic material, and notwithstanding the use of the gun in relatively inaccessible places where its operation can not be observed.

It is a still further object to provide a structure wherein a screen will protect the pressure-equalizing device or the safety blow-out device against the possibility of clogging, either from foreign material introduced with the pressure-generative substance, or from any possible accidental spilling of plastic material into the pressure chamber.

In the accompanying drawings, the invention is shown in typical forms such as are presently preferred, it being understood, however, that the device may take other forms within the scope of the appended claims.

Figure 1 is an axial sectional view through the sealant gun of this invention, in a presently preferred form of construction, the sealant material having been omitted.

Figure 2 is a side elevational view of the discharge-controlling elements of the sealant gun.

Figure 3 is a transverse sectional view taken at the line 3—3 of Figure 1.

Figure 4 is an axial sectional view through the complete tool, in a modified form.

Figure 5 is a transverse sectional view substantially as indicated at 5—5 in Figure 4, illustrating primarily the discharge-controlling valve and its operating mechanism.

Figure 6 is an isometric view of a typical aircraft structure, broken away in part, and illustrating usage of the tool, in the form of Figure 4, in a confined or nearly inaccessible space.

In brief, the invention comprises a barrel of tubular shape, such as will snugly receive a carton filled in advance with the plastic sealant material, the barrel having a nozzle at one end and a removable cap at the opposite end, permitting insertion of a filled carton, so that the cap defines between itself and the slidable bottom of the inserted carton a chamber into which a pressure-generative substance, such as Dry Ice (solid carbon dioxide), may be introduced. A suitable safety device, such as a bleed valve, and a pressure-equalizing device, such as a blow-off plug, are carried by the cap, connecting with the pressure chamber. A valve controls discharge from the nozzle, and suitable operating mechanism allows the valve to be opened and closed at will. Internally the cap cooperates with the barrel to clamp the plunger-closed end of the carton, so that this end will not collapse accidentally upon access of pressure, but its bottom will be free to slide as a plunger toward the discharge end of the carton for expulsion of the plastic from the barrel's nozzle. Other details will be described hereinafter.

The barrel 1 is tubular and of constant cross-section throughout its length. An end closure 10 may be removably or otherwise secured to the one end of the barrel, leading to a nozzle 11, and a counterbored cap 2 is threaded at 21 or is similarly removably secured upon the opposite end of the barrel. The carton C, within which the sealant material is contained, is of a size to fit the barrel, or conversely, the barrel is formed of a size to snugly embrace the carton, when the latter is inserted therein. The carton is provided with a bottom or end closure B which is slidably received within its end opposite the discharge end D. At its bottom end the carton is formed with an outwardly directed flange F.

Adjacent the nozzle 11, or in any event between the discharge end D of the carton and the nozzle 11, or at the nozzle, means are provided to close off discharge of the sealant, or to permit such discharge, under control. A flexible plastic tube 6, having a flange at 60, is inserted in the bore or through port 14 of the cap 10, and can be pinched shut, as a valve, by clamp pins 61 guided in transverse apertures in the cap 10. Spring arms 62 embrace the cap's neck, and are sprung inwardly to urge the pins inwardly, to effect closure of the valve, by engagement of their ends in cam slots 63 in a hand wheel 64 oscillatably mounted upon the cap 10. The spring arms are guided, as by their reception in lateral grooves 65, to remain always in engagement with the pins 61. Rotation of the wheel 64 in one sense closes the valve, and its rotation in the opposite sense frees it for exudation of the plastic sealant material.

In the form of Figures 4, 5 and 6 the valve body 3 is cylindrical, with a through port 30, and may be received within a sleeve 31. By rotating the valve 3 through 90°, it may be placed in communication with the through port 14 from the interior of the barrel to the nozzle, or by reverse rotation, the through port is closed. Rotation may be accomplished by mounting a gear segment 33 upon the valve body 3, exteriorly of one end of the sleeve 31, and by providing a meshing gear segment 44 upon a rocking operating handle 4, which is pivotally mounted at 40 upon an ear 34 which is carried by the end cap 10. A spring 41 serves to return parts to the normally closed position, but will yield for movement of the valve into the open position. Stop means, not shown specifically, are associated between the meshing gear portions 33 and 44 to limit closing movement of the valve. The handle 4 extends generally alongside the barrel 1, so that the thumb of a hand which grasps the barrel may readily rotate the wheel 64 or depress the operating handle 4, as is illustrated clearly in Figure 1.

It will be seen in Figures 1 and 4 that the cap 2 is inwardly shouldered at 22, adjacent the end of the barrel 1. The flange F of the carton C extends outwardly about the end of the barrel and is clamped and held between this end of the barrel and the shoulder 22 of the cap 2, when the latter is screwed into place. This retains the end of the carton securely. Likewise it will be seen that there is a ring 20, which seats within a shoulder on the cap 2, and which projects axially inwardly of the carton C. This allows just sufficient space between its outer periphery and the inner wall of the barrel to hold the end of the carton further, and it also serves to unseat and start inwardly the bottom B of the carton. In addition, a screen 5 is clamped and held between the ring 20 and the slight shoulder on the cap which supports this ring 20.

Preferably, but not necessarily, the bottom B is inwardly or upwardly domed. In any event, there is formed between this bottom B and the counterbore of the cap 2 a chamber 23, which is completely closed off when the cap 2 is secured in place on the end of the barrel. This chamber is for the purpose of receiving a pressure-generative substance such as the chunk of Dry Ice A, which is illustrated in Figures 1 and 4. By placing the Dry Ice on the screen 5, it is separated from blow-off or bleed devices which will shortly be described, and any foreign substance that might be admitted with the Dry Ice, or any sealant material that might leak past the bottom B, will not gain access to, nor be able to clog, these blow-off or bleed devices. On the other hand, the pressure generated by the Dry Ice, as it sublimes, will tend to move the bottom B from the full-line position of Figures 1 and 4 to the dash-line position thereof, and beyond, whenever the sealant is expelled from time to time by opening of the valve 6 or 3.

The cap 2 is ported at 24, and a blow-out plug 25 is secured therein, sealing the same customarily, but capable of being ruptured by excessive pressure within the chamber 23. Another port 26 is provided in the cap, and this is closed by a bleed valve 27, held closed by a plug 28, but upon relaxation and partial withdrawal of the plug 28, the valve 27 may unseat and permit pressure to be bled from the interior of the barrel. By the use of this bleed valve, any excess of internal pressure over external pressure may be bled off when it is necessary to refill the gun; the blow-out plug 25 is the primary means to relieve excessive pressure during use, automatically, from the chamber 23.

It is believed that it will be clear how such a gun may be loaded and how it may be inserted through an access opening H in the structure, so that the tip of the nozzle 11 may reach a joint which is to be sealed, whereupon by rotating the wheel 64 or by pressing the handle 4, the valve 6 or 3 is opened, and the pressure accumulated within the chamber 23 expels the sealant from the gun. The device is always ready for operation, and requires no trailing wires, air hoses, or other accessory devices. It is completely self-contained. There is no appreciable waste of the Dry Ice, and whenever additional pressure is desired, it is only necessary to insert a fresh piece of Dry Ice, which is readily available in industries which would use such a gun.

We claim as our invention:

1. A self-contained dispenser for a paste-like material, including a rigid barrel open at one end, a nozzle fitting its opposite end, a removable cap normally closing the open end of the barrel; a resiliently deformable tube interposed in the nozzle between its tip and the interior of the barrel, clamping elements guided in the nozzle for approach and recession, in position to pinch said tube upon approach, and to free the same upon recession, means carried by the nozzle and operable to actuate said clamping elements in either sense, to control discharge from the nozzle; a separate container for the paste-like material to be dispensed, including a sleeve of a size to fit snugly within the barrel and to seat at the nozzle end thereof, and a form-sustaining end closure inset within and fitting slidably within the sleeve, initially at the cap-closed end of the barrel; said inset end closure defining a chamber between itself and the removable cap for accumulation of pressure fluid, wherewith to urge the end closure, as a plunger, bodily axially towards the nozzle end of the barrel and sleeve, whenever the discharge-controlling means are in position for discharge.

2. A dispenser as in claim 1, wherein the clamping elements comprise two diametrically opposite, aligned clamping pins engageable with the tube at their inner ends, and guided in the nozzle with their outer ends protruding, spring arms engaged with the outer ends of said pins, and the actuating means being operatively engaged with said spring arms to urge them inwardly, or to permit them to relax outwardly.

3. A dispenser as in claim 2, wherein the spring arms embrace the nozzle, and the actuating means comprises a wheel oscillatably mounted upon the nozzle, and having cam slots engaged with said spring arms.

4. A self-contained dispenser for a paste-like material, including a rigid barrel open at one end, a nozzle fitting its opposite end, a removable cap normally closing the open end of the barrel; valve means controlling discharge from the interior of the barrel through the nozzle; a separate container for the paste-like material to be dispensed, including a sleeve of a size to fit snugly within the barrel, and to seat at the nozzle end thereof, and a form-sustaining end closure inset within and fitting slidably within the sleeve, initially at the cap-closed end of the barrel; said inset end closure defining a chamber between itself and the removable cap for accumulation of a pressure fluid, wherewith to urge the end closure, as a plunger, bodily axially towards the nozzle end of the barrel and sleeve, whenever the valve means are in open position; a bleed valve leading from said pressure chamber for relief of excess pressure therein, and a screen disposed transversely of the chamber, intermediate the bleed valve and the end closure.

5. The combination of claim 4, wherein the valve means includes a rotary valve body interposed between the nozzle and the interior of the barrel, and including a gear segment carried by the valve body, a meshing gear segment oscillatably mounted upon the valve body, an operating handle operatively connected to said meshing gear segment to oscillate the latter, for opening and closing the rotary valve body, and a return spring to return the handle and the valve body to closed position after movement to open position.

6. A self-contained dispenser for a paste-like material, including a rigid barrel open at one end, a nozzle fitting its opposite end, a removable cap normally closing the open end of the barrel, the cap being inwardly flanged adjacent and overlying the end of the barrel; valve means controlling discharge from the interior of the barrel through the nozzle; a separate container for the paste-like material to be dispensed, including a sleeve of a size to fit snugly within the barrel, and to seat at the nozzle end thereof, an outwardly directed flange on the opposite end of the sleeve, interposed and clamped between the inward flange of the cap and the end of the barrel which is overlaid by said cap flange, and a form-sustaining end closure inset within and fitting slidably within the sleeve, initially at the cap-closed end of the barrel; said inset end closure defining a chamber between itself and the removable cap for accumulation of pressure fluid, wherewith to urge the end closure, as a plunger, bodily axially towards the nozzle end of the barrel and sleeve, whenever the valve means are in open position.

7. The combination of claim 6, including a ring supported from the cap and projecting axially within the bottom end of the carton, to engage and initiate axial movement of that bottom end.

8. The combination of claim 7, including a screen extending transversely, the cap being inwardly shouldered, and said screen being secured about its edges between such shoulder and the axially projecting ring.

References Cited in the file of this patent

UNITED STATES PATENTS

| | | |
|---|---|---|
| 1,471,091 | Bessesen | Oct. 16, 1923 |
| 1,729,219 | Kellogg | Sept. 24, 1929 |
| 1,751,128 | Cocks | Mar. 18, 1930 |
| 2,301,724 | Vischer | Nov. 10, 1942 |
| 2,432,261 | Thompson | Dec. 9, 1947 |

FOREIGN PATENTS

| | | |
|---|---|---|
| 425,127 | Great Britain | Mar. 7, 1935 |